United States Patent [19]

McAllister

[11] 4,181,898

[45] Jan. 1, 1980

[54] CONTROLLED FREQUENCY HIGH POWER LASER

[75] Inventor: Gary L. McAllister, Richland, Wash.

[73] Assignee: Jersey Nuclear-Avco Isotopes, Inc., Bellevue, Wash.

[21] Appl. No.: 781,800

[22] Filed: Mar. 28, 1977

[51] Int. Cl.² .............................................. H01S 3/10
[52] U.S. Cl. ................................................. 331/94.5 S
[58] Field of Search ................... 331/94.5 C, 94.5 D, 331/94.5 M, 94.5 FS, 94.5 S; 356/106 LR

[56] References Cited

U.S. PATENT DOCUMENTS 3,944,947  3/1976  Pike et al. .................. 331/94.5 D

OTHER PUBLICATIONS

Bondarenko et al., Stabilization of a Ruby Laser Using an He–Ne Laser as a Frequency Reference, JETP Lett., vol. 22, No. 2 (Jul. 20, 1975), pp. 46 and 47.

Primary Examiner—William L. Sikes

Attorney, Agent, or Firm—Weingarten, Maxham & Schurgin

[57] ABSTRACT

A system for frequency locking the output of one or many laser amplifiers to a reference laser oscillator beam without injection of the reference beam into the amplifier medium. This avoids the necessity of exciting at the frequency of the desired output and of beam splitting from the oscillator to inject a portion of the oscillator radiation into each of several controlled amplifiers. The amplifier includes a lasing medium confined within a cavity and having a portion of the radiation in the medium directed onto a closed loop. A frequency selecting element is supplied within the closed loop and controlled electronically to maintain a predetermined frequency relationship to the laser beam of the reference laser oscillator. Radiation in the closed loop is thus controlled in frequency and a portion of it within the amplifier medium is diverted for repeated medium traversals in an unstable cavity configuration to achieve a desired amplification and pulse elongation.

22 Claims, 2 Drawing Figures

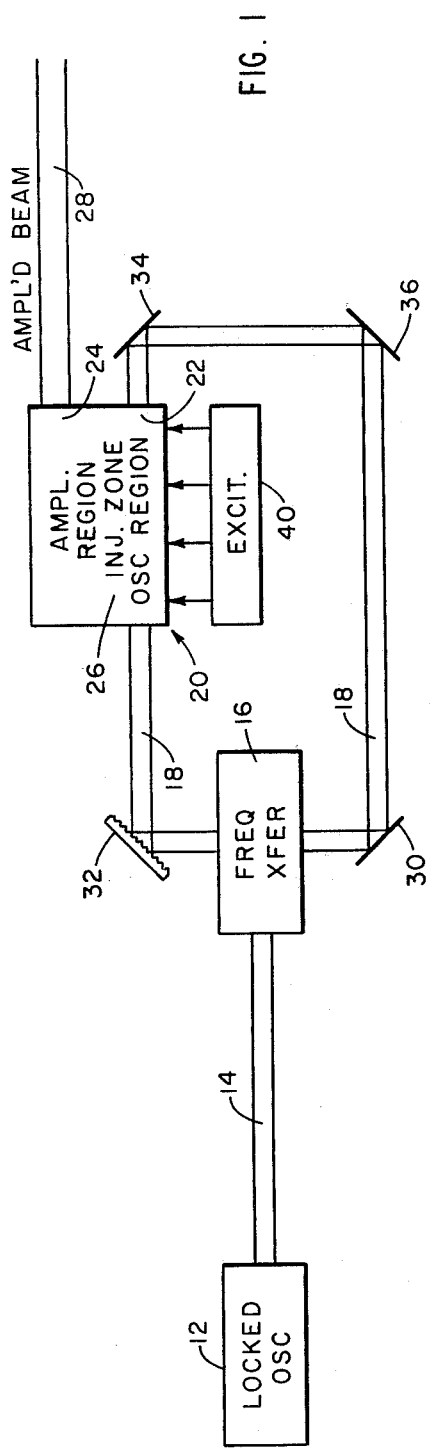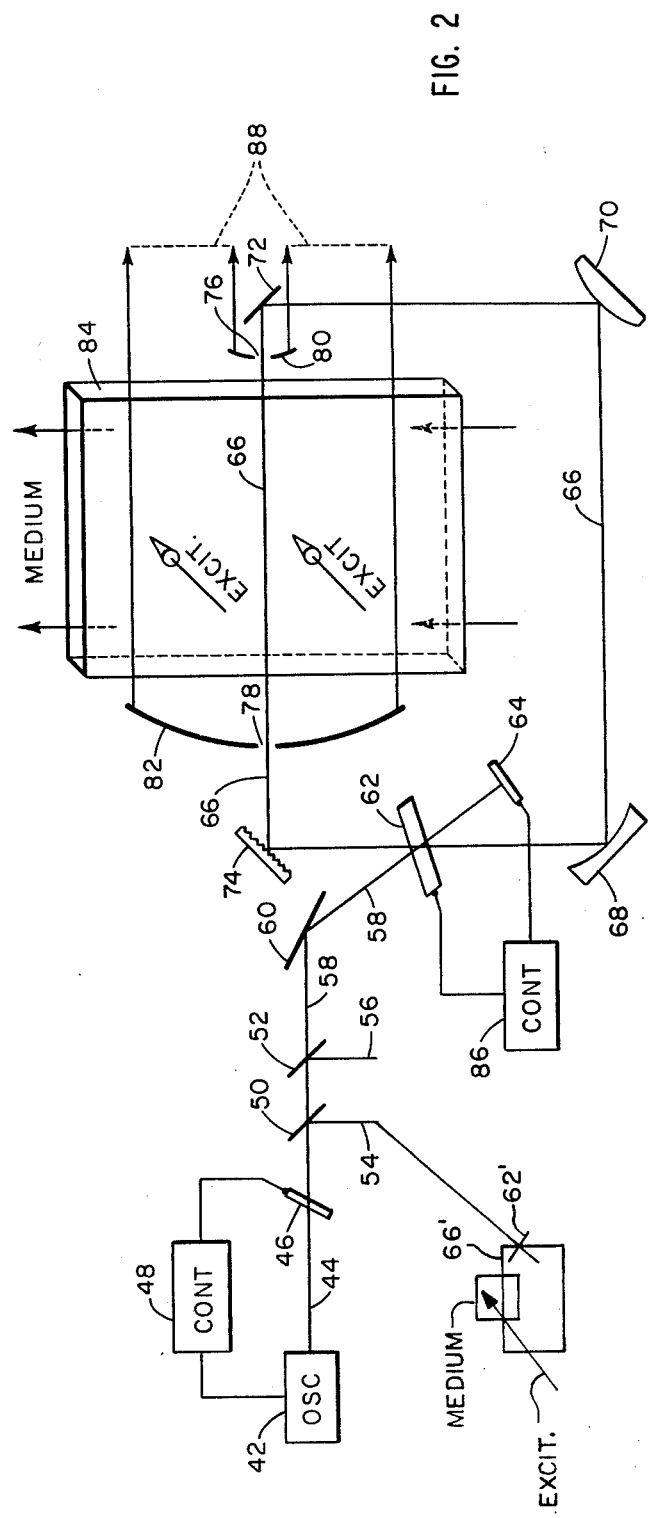

CONTROLLED FREQUENCY HIGH POWER LASER

FIELD OF THE INVENTION

The present invention relates to frequency control of laser amplifiers and in particular to frequency control without injection of a reference frequency beam into the amplifier lasing medium.

BACKGROUND OF THE INVENTION

In applications where it is desired to control the frequency of a number of amplified laser beams to a single frequency as provided by a reference laser oscillator, it is typical to distribute the beam of laser radiation, and accordingly the energy in the beam to a set of parallel amplifier channels. Particularly where the duration of the beam of the reference oscillator is short as in the case of this application to laser isotope separation, it is further desirable to elongate the beam of laser radiation by using an injection locked oscillator which recycles the pulse several times through a laser medium causing its repeated occurrence and effectively stretching the individual pulse to the desired length. Systems of this sort are typically shown in U.S. Pat. No. 3,944,947.

Where a great many injection locked oscillators are required, the energy division in the reference beam necessitates not only a sophisticated beam distribution system but perhaps additional master oscillators for the reference beams in order to insure sufficient distributed energy to properly activate the injection locked oscillators. Finally in any configuration where a low power reference frequency beam is injected into an oscillator amplifier configuration for frequency control, there is a potential for feedback toward the reference oscillator of laser beam energy which may disturb the operation of the source of reference laser radiation or possibly damage it.

BRIEF SUMMARY OF THE INVENTION

In accordance with the teaching of the present invention there is shown a system for frequency locking one, or typically, many high power laser amplifiers to the frequency of a single reference beam without injection of the beam into the amplifier medium. The one or more amplifiers according to the invention include a medium extending between apertured mirrors of an unstable cavity with the center of the cavity between the mirror apertures included within a closed path of laser radiation. Radiation circulating on this closed path in response to excitation of the medium in the unstable cavity is defined in frequency by a frequency selective element placed within the closed path and controlled in its operation by the frequency of radiation from a reference oscillator. In this manner the radiation in the closed path is maintained in a predetermined frequency relationship to the reference frequency, typically a slightly different frequency, without the need to inject any of the reference beam directly into the closed path. Thus the frequency locked radiation circulating in the closed path controls the frequency of the amplified beam as it spreads through the unstable cavity to provide a system output beam.

The reference beam is typically distributed by beam splitters or other means to a plurality of closed paths with unstable cavity systems without the problems resulting from energy division in the beam when it must be injected into a multiplicity of amplifier channels. In addition, the physical proximity of the frequency locked beam in the closed path and the unstable cavity region of amplified radiation provides an efficient injection of the radiation from the closed path which in conjunction with the rapid buildup of energy within the closed path due to its feedback promotes establishment of the frequency of the amplified beam before oscillating parasitics resulting from excitation of the medium generally can become established. Finally, the beam of frequency locked radiation can be made to circulate through the closed path at a relatively high energy density by high energy excitation of the laser medium within the unstable cavity as a whole. This insures efficient transfer from the frequency locked frequency into the unstable cavity.

BRIEF DESCRIPTION OF THE DRAWING

These and other features of the present invention are more fully set forth below in the exemplary and nonlimiting detailed description of the invention and in the accompanying drawing of which:

FIG. 1 is a block diagram of the elements of a frequency locked high power amplifier in accordance with the present invention; and FIG. 2 is a detailed schematic diagram of the system illustrated in FIG. 1.

DETAILED DESCRIPTION OF THE INVENTION

The present invention contemplates a system whereby one or preferably several high power laser amplifiers are frequency locked by a single reference beam from a single master oscillator without injection of the reference laser energy into each amplifier laser medium. The general form of the invention in accomplishing these objectives is illustrated in block form in FIG. 1. As shown there an oscillator 12 is provided which generates a reference beam 14 of a specified predetermined frequency which in the case of the application of the invention to isotope separation as indicated in the above-referenced U.S. Pat. No. 3,944,947, specifically incorporated herein by reference, is radiation defined in frequency and bandwidth for isotopically selective excitation of a desired uranium isotope, typically U-235. In this application, the frequency of the beam 14 is maintained at the desired wavelength, for example, by frequency locking to an emission or absorption line of the uranium atom. The beam 14 is directed toward a frequency transfer element 16 which is interposed within a closed path 18 for laser radiation through an amplifier 20 which includes an oscillating region 22 permitting the passage of the radiation around the closed path 18 and further includes an amplification region 24 which acts to receive a portion of the radiation in the beam path 18 passing through the oscillator region 22 through an injection zone 26 to provide amplification thereof to ultimate emission as a highly amplified output beam 28. The closed path 18 is defined by a set of mirrors or reflective elements 30, 32, 34 and 36 some of which may be frequency selective as in the case of grating 32 and/or focusing as indicated below.

The frequency transfer element 16, as more fully described below, is operative to provide frequency control over the radiation in the path 18 to maintain a predetermined frequency relationship between that radiation and the radiation in beam 14. Typically, the two beams are maintained at slightly different frequencies in accordance with the specific implementation described below.

In this manner, the energy in the beam 14 is not required to be injected into the lasing medium for amplification, but using frequency comparison techniques is effective in maintaining control over the frequency of the beam in the path 18. Additionally, the recirculating nature of the beam in path 18, while preferable but not necessary to the operation of the invention, achieves the additional function of producing a pulse of radiation of long duration, up to an interval of nearly a microsecond as determined by the duration of excitation radiation for the laser medium 20 from an excitation source 40, such as a flashlamp.

A complete schematic diagram of the system functionally indicated above in FIG. 1 is shown in the accompanying FIG. 2. As indicated there an oscillator 42 is provided as the master reference oscillator having an output beam 44 of predetermined frequency particularly selected for use in a system of isotopically selective excitation. The beam 44 is controlled at a desired frequency by passing through a frequency selected element 46 which is operative with a control system 48 to maintain the frequency as is known in the art. Since the invention is intended for use in uranium isotope separation, it is convenient to lock the frequency of beam 44 to an absorption line in uranium vapor, typically a line for the U-238 isotope because of its abundance. The desired frequency in the amplified output beam will then be maintained at the adjacent U-235 absorption by the control system described below.

The beam 46 passing through frequency selective element 46 is typically divided into several paths by beam splitters 50 and 52 which provide separate beams 54, 56 . . . and 58 which may or may not be evenly distributed in energy content. These separate beams are then used for frequency control of other amplifiers. The remainder of the system is shown with respect to the amplifier system applied to only one of the beams such as beam 58.

The beam 58 may be redirected by one or more mirrors 60 so as to pass through a frequency selective element 62 such as a Fabry-Perot filter to produce a set of fringe patterns positionally related to frequency. The fringe pattern is directed onto a photocell 64 with the position of the pattern varying the photocell output. A controller 86 responds to the photocell output to rotate element 62 about an axis perpendicular to the page so as to maintain the position of an individual fringe at the photocell.

A path 66 of separate laser radiation passes through the frequency selective element 62 on a closed path provided by reflections of a concave mirror 68, a convex mirror 70, a plane mirror 72, and a diffraction grating 74. Mirrors 68 and 70 are provided in a concave/convex arrangement for purposes of divergence control in the radiation passing on the path.

The portion of the path 66 between the plane mirror 72 and the diffraction grating 74 passes through apertures 76 and 78 of cavity defining convex mirror 80 and concave mirror 82 respectively. Between the mirrors 80 and 82 is a channel 84 for a laser medium typically a flowing dye solution capable of efficient lasing at the predetermined selected frequency. In the embodiment of FIG. 2 the mirrors 80 and 82 are indicated as cylindrical in configuration and the cross-section of the channel 84 is rectangular with transmissive end walls adjacent apertures 76 and 78 through which the path 66 passes as well as rectagonal side walls along the other channel border for admitting excitation energy for pumping of the laser medium. In the case of cylindrical mirrors 80 and 82, the divergence control mirrors 68 and 70 may also be cylindrical. Spherical mirrors may also be used throughout.

Frequency control over the radiation passing along the path 66 is maintained by the frequency selective element 62 through the feedback control system 86. This control is provided, as indicated above, to maintain a fringe of the radiation in beam 58 as provided by element 62 at a preselected point on photocell 64. By setting the radiation in the path 66 to have the desired frequency at the angle through element 62 at which the fringe of the radiation in beam 58 is properly located on the photocell, control over element 62 based on beam 58 will also maintain the radiation in path 66 at the same frequency.

More particularly, the element 62, typically a Fabry-Perot filter, produces a series of interference rings spaced from each other in accordance with the frequency of the impinging radiation and the characteristics of the Fabry-Perot filter such as plate spacing. In this manner, the element 62 acts as a frequency dependent filter, varying the position of the fringe pattern with frequency or filter angle. Where the system operates to produce a frequency in the beam 44 which is controlled at an absorption line for U-238, the filter element 62 is positionally regulated to maintain a position which controls the position of the fringe relative to the photocell 64. The same filter is positioned in the laser path 66 for the controlled radiation. Where it is desired that the radiation in path 66 is controlled at an absorption line for U-235, the Fabry-Perot is constructed to have an integral number of fringes between absorption lines for the two isotopes, U-235 and U-238. The beam 58 is passed through the Fabry-Perot at the U-238 fringe and the path 66 is then directed through the Fabry-Perot on the separate fringe for the U-235 line, typically on the other side of the filter optical axis.

The radiation which is generated along one of the paths 66 from lasing of the excited portion of the medium in channel 84 is thus controlled in frequency. By having regenerative feedback in the path 66, lasing is maintained along the path 66 for the duration of the excitation of the medium. In this manner, frequency control over the radiation in path 66 is maintained without injection of actual radiation from the beam 44 into the cavity of the amplifier.

The mirrors 80 and 82 define an unstable cavity for the excited laser medium within the channel 84 resulting in a portion of the radiation passing between the mirrors along the path 66 being intercepted by the reflective portions either side of apertures 76 and 78. Subsequent reflections of the intercepted beam edges result in a gradual divergence of radiation away from the path 66 on repeated, amplified traversals of the medium within channel 84 to emerge as on output beam 88 of highly amplified laser radiation. The cavity is designed to provide overlap between successive passes so as to establish a standing wave pattern within the cavity that effectively frequency locks the radiation as it diverges from the path 66. Precise frequency control of the beam in its multiple traversals through the medium in channel 84 by repeated reflections from mirrors 80 and 82 is thus maintained. Such a consideration places a restriction upon the size of the apertures 76 and 78 and the characters of the mirrors 80 and 82 in accordance with known unstable cavity technology.

A further advantage to the system of FIG. 2 results from the fact that the radiation on the path 66 passes through the medium in channel 84 which has been fully excited for the high power amplification thus insuring a rapid build-up of radiation intensity along the path 66 before parasitic or random lasing effects can occur. This advantage in combination with the simplicity provided by the absence of actual injection of the master oscillator radiation and isolation of the master oscillator from energy in the amplifying section further contributes to the simplicity, reliability and efficiency of the system as a means for providing multiply amplified beams of laser radiation controlled by a single master oscillator or reference laser beam.

In the case of multiple laser amplifiers frequency control by the same oscillator is readily achieved by providing plural beams 54, 56 and 58 as mentioned above. As illustrated in FIG. 2, the amplifier may be duplicated through further frequency selective elements 62'; mediums, excitations energy, and radiation paths 66'; acting on the radiation in beams 54, 56, etc., and their associated elements described above.

The above-described embodiment of the present invention is presented for purposes of exemplifying the invention. Alternatives or improvements which fall within its sphere are intended to be claimed. Accordingly, the scope of the invention is to be limited only in accordance with its definition in the following claims.

What is claimed is:

1. A frequency controller laser comprising:
 means for providing laser radiation of a predetermined frequency;
 a laser medium;
 means for defining a regenerative path for laser radiation encompassing said laser medium;
 means for exciting said laser medium to a lasing condition whereby radiation from said medium travels on said path;
 means for amplifying the radiation within said laser medium and including an unstable cavity with said laser medium positioned therebetween and extending to between peripheral positions of said unstable cavity;
 means for maintaining a predetermined frequency relationship between said radiation of predetermined frequency and the laser radiation on said regenerative path in response to the lasing of said laser medium and in the absence of radiation of said predetermined frequency on said regenerative path.

2. The frequency controlled laser of claim 1 wherein said unstable cavity includes first and second mirrors having central apertures therethrough co-extensive with portions of said regenerative path either side of said laser medium.

3. The frequency controlled laser of claim 2 wherein said first mirror is concave and wherein said second mirror is convex.

4. The frequency controlled laser of claim 3 wherein said first and second mirrors are configured to provide standing wave patterns in the radiation in the laser medium between said first and second mirrors.

5. The frequency controlled laser of claim 1 further including a plurality of said means for defining a regenerative path, and corresponding laser mediums, excitation means, and means for maintaining a predetermined frequency relationship each in combination with means for diverting a portion of said laser radiation of predetermined frequency to corresponding ones of the plural means for maintaining a preset frequency relationship.

6. The frequency controlled laser of claim 1 wherein said means for maintaining a predetermined frequency relationship between said laser radiation of predetermined frequency and the laser radiation on said path includes means transmissive to said radiation along a frequency dependent angle positioned to pass the radiation of said predetermined frequency at an angle therefor and to pass the radiation on said path at an angle corresponding to its frequency.

7. The frequency controlled laser of claim 6 wherein said maintaining means includes means for positionally controlling said transmissive means to regulate the angle of passage therethrough for said radiation of predetermined frequency.

8. The frequency controlled laser of claim 6 wherein said transmissive means includes a filter providing a pattern of interference rings, a ring lying along said regenerative path and with a ring lying along the path of said radiation of predetermined frequency.

9. The frequency controlled laser of claim 8 wherein said radiation of predetermined frequency has a frequency corresponding to an absorption line for one material and the radiation on said regenerative path has a frequency separated from the other radiation of predetermined frequency by a frequency corresponding to a selected number of rings.

10. The frequency controlled laser of claim 9 wherein said transmissive means is constructed to provide said radiation on said regenerative path corresponding to a different absorption line for a second material.

11. The frequency controlled laser of claim 10 wherein said one material and said second material are the U-238 and U-235 isotopes of uranium.

12. The frequency controlled laser of claim 1 wherein said regenerative path includes means for reducing divergence in the radiation therealong.

13. The frequency controlled laser of claim 1 wherein said medium includes a solution flowing in a direction with the direction thereof, the direction of said regenerative path therethrough, and the direction of excitation thereof all mutually orthogonal.

14. A frequency locked laser amplifier comprising:
 a source of laser radiation of a predetermined frequency;
 a laser medium;
 an unstable cavity bounding said laser medium and comprising a concave mirror to one side of said laser medium and a convex mirror on an opposite side of said laser medium;
 said concave and convex mirrors having apertures therethrough;
 means for defining a closed path for the circulation of laser radiation through said apertures of said concave and convex mirrors and through said laser medium;
 a frequency selective element in the path of radiation of said closed path for laser radiation;
 means responsive to said radiation of predetermined frequency for controlling said frequency selective element to maintain a predetermined frequency relationship between said radiation of predetermined frequency and the radiation circulating in said closed path and to avoid transfer of radiation between said closed path and the path for the radiation of predetermined frequency;

said laser medium extending through said unstable cavity beyond the region between the apertures in said concave and convex mirrors;

said concave and convex mirrors in association with the apertures therethrough providing frequency control over the radiation passing from the region between said apertures in said laser medium to the region between reflective portions of said concave and convex mirrors for amplification therein at the frequency of radiation circulating in said closed path;

said concave and convex mirrors providing an output beam of amplified laser radiation of the frequency of radiation circulating in said closed path.

15. The frequency locked laser of claim 14 wherein said concave and convex mirrors are cylindrical.

16. The frequency locked laser of claim 14 wherein said mirrors are dimensioned to provide an overlap between reflecting radiation such that a standing wave pattern develops.

17. The frequency locked laser of claim 14 wherein said controlling means includes a Fabry-Perot filter.

18. The frequency locked laser of claim 14 further including a transverse flow channel bordering said medium.

19. A frequency controlled laser comprising:
means for providing first laser radiation;
means for controlling the laser radiation to a frequency determined by an absorbtion line for a first isotope type of a material;
a laser medium;
means for defining a regenerative path for laser radiation encompassing said medium;
means for exciting said laser medium to a lasing condition whereby radiation from said medium travels on said path;
said controlling means including means for maintaining a frequency in said radiation on said regenerative path at a frequency corresponding to an absorption frequency for a further isotope type of said material in response to the control of said controlling means and in the absence, on said regenerative path, of radiation of said frequency determined by said first isotope type of said material.

20. The laser of claim 19 wherein said material includes uranium.

21. The laser of claim 20 wherein said first isotope is the U-238 isotope and said further isotope is the U-235 isotope.

22. The frequency controlled laser of claim 21, wherein said maintaining means includes means for providing an interference pattern in response to said laser radiation of frequency determined by said first isotope type and of laser radiation on said regenerative path wherein the ring spacing for the radiation corresponds to the frequency difference between the absorption lines for said first and further isotope types.

* * * * *